(12) United States Patent
Klinger

(10) Patent No.: US 6,978,341 B2
(45) Date of Patent: Dec. 20, 2005

(54) COMPUTER, A METHOD OF CONNECTING DEVICES TO DATA BUS CONTROLLERS, A METHOD OF ALLOCATING THE BANDWIDTH OF A PLURALITY OF DATA BUS CONTROLLERS AND APPARATUS THEREFOR

(75) Inventor: Werner Klinger, Lyons (FR)

(73) Assignee: Hewlett-Packard Development Company, L.P., Houston, TX (US)

( * ) Notice: Subject to any disclaimer, the term of this patent is extended or adjusted under 35 U.S.C. 154(b) by 293 days.

(21) Appl. No.: 10/131,585

(22) Filed: Apr. 23, 2002

(65) Prior Publication Data

US 2002/0188791 A1    Dec. 12, 2002

(30) Foreign Application Priority Data

Apr. 23, 2001  (EP) .................................. 01410042

(51) Int. Cl.[7] .............................................. G06F 13/00
(52) U.S. Cl. ...................................... 710/316; 710/317
(58) Field of Search .............................. 710/306, 316, 710/317, 311, 313; 370/351, 352, 449

(56) References Cited

U.S. PATENT DOCUMENTS

| 6,732,219 B1 * | 5/2004 | Broyles ...................... 710/316 |
| 2002/0144033 A1 * | 10/2002 | Ragland |
| 2003/0110342 A1 * | 6/2003 | Chiang et al. |

FOREIGN PATENT DOCUMENTS

EP    0 425 807 A1    9/1990

OTHER PUBLICATIONS

Patent abstracts of Japan, vol. 1996, No. 08, Aug. 30, 1996, & JP 08 095901 A (Hitachi Ltd.) (Apr. 12, 1996).

* cited by examiner

*Primary Examiner*—Khanh Dang

(57) ABSTRACT

A computer having a plurality of data bus controllers, a plurality of grouped controller ports and a plurality of connection elements for connecting the controllers to the ports, wherein each controller has a maximum available controller bandwidth; characterized in that the connection elements are arranged such that each controller is connected to ports from different groups such that data pathways between the controllers and the ports are not variable, and a maximum port group bandwidth available to each port group cannot be changed, irrespective of a bandwidth demand at said each port group.

11 Claims, 3 Drawing Sheets

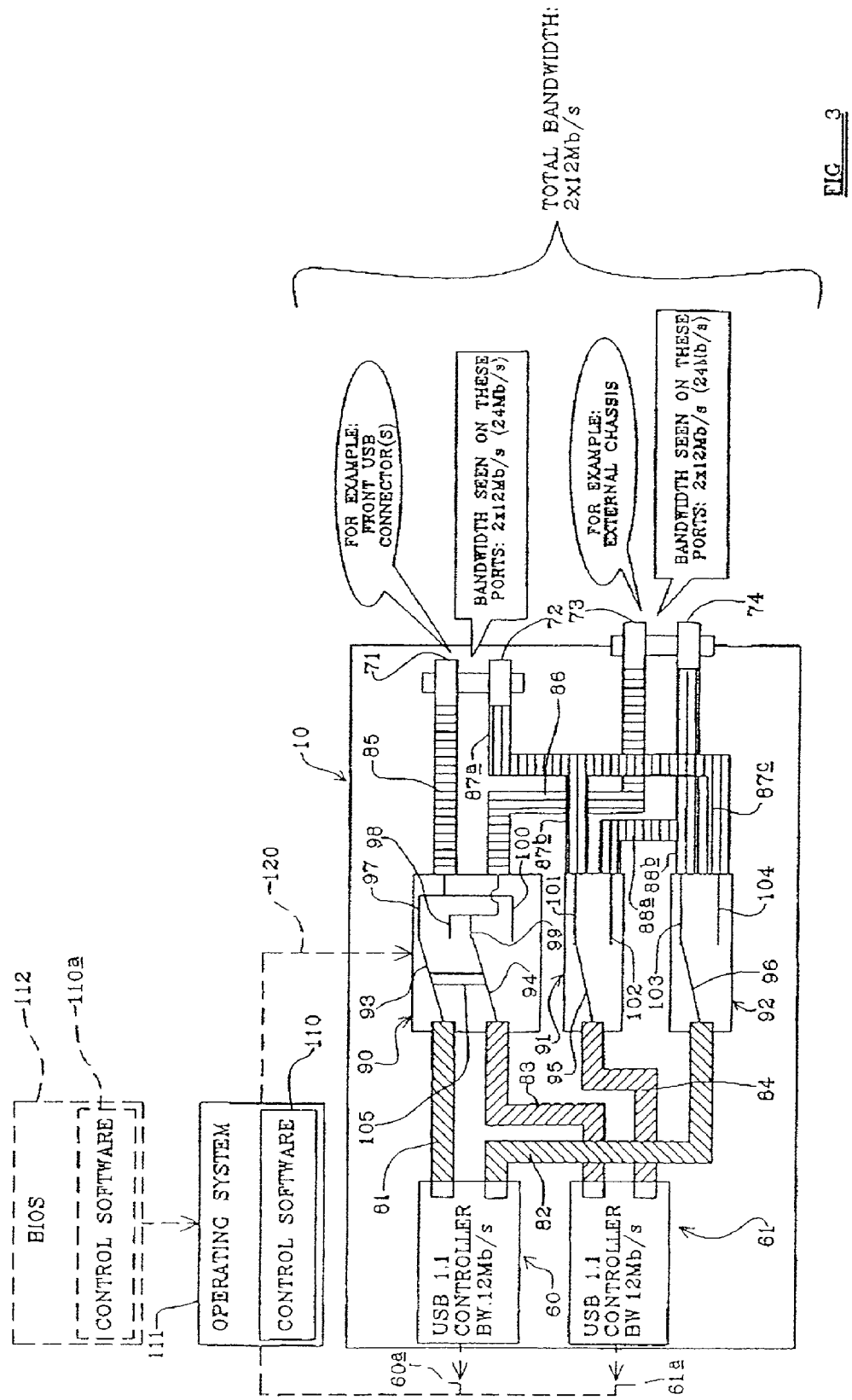

COMPUTER, A METHOD OF CONNECTING DEVICES TO DATA BUS CONTROLLERS, A METHOD OF ALLOCATING THE BANDWIDTH OF A PLURALITY OF DATA BUS CONTROLLERS AND APPARATUS THEREFOR

DESCRIPTION OF AND BACKGROUND TO THE INVENTION

This invention relates to a computer, a method of connecting devices to data bus controllers, a method of allocating the bandwidth of a plurality of data bus controllers and apparatus therefor.

More particularly, but not exclusively, the invention relates to a method of and to apparatus for allocating bandwidth of serial data buses such as USB's (Universal Serial Buses) where a plurality of such buses are provided in a computer, for connection with a plurality of associated serial devices.

As with all data bus interfaces, USB bandwidth is limited, with the well-known USB 1.1 version having a theoretical maximum band width of 12 Mbits per second, with this bandwidth being shared by all the serial devices connected to the various ports which in turn are connected to the USB controller.

For low bandwidth devices such as mice, modems and some scanners, the relatively limited available bandwidth usually presents few problems, although devices requiring greater data throughput such as hard disc drives and web cams, for example, can, if used together, rapidly use up the available bandwidth, leading to "clogging" of the serial controller, which in turn results in greatly slowed data transfer.

In extreme cases, this can make it impossible to use one of the connected devices, leading to considerable user dissatisfaction and increased calls, for example, to technical help desks.

Although faster serial buses such as the USB 2.0 are available, increases in serial bus bandwidth are invariably followed by corresponding increases in the bandwidth required by modernised devices, and it has become apparent that mere expansion of the serial bus bandwidth is unlikely to address this problem on anything more than a temporary basis.

Attempts have however been made to alleviate these difficulties, with these having concentrated primarily on the provision of computers having more than one serial bus controller, thus making more bandwidth available to the various serial devices.

However, this in itself has not proved satisfactory.

As shown in FIG. 1 of the drawings, which illustrates the current industry standard way in which USB controllers are connected to serial ports on a computer chassis, the connectivity between the USB controllers and their associated serial ports is such that each "pair" of ports is linked to just one USB controller. Although, with low bandwidth devices, such a configuration can operate satisfactorily, problems arise where the sum of the bandwidth required by the two devices connected to the ports forming a pair, exceeds that which is available from the associated USB controller.

This can be a particular problem where, say, one pair of ports is located towards the front of a computer, with a second pair being located towards the rear. What often happens, in practice, is that a user of the computer, having connected, for example, a web cam to one port of the front pair, then connects a second device such as, for example, a pair of USB speakers, in the next adjacent slot. As will be appreciated, this "fills" both ports of the front pair, and thus places a heavy burden on the controller associated with it At the same time, a rear-mounted pair is often left completely unused, perhaps because access to the rear ports is difficult.

Thus, the current industry standard implementation can often give rise to a situation where one of the two (or more) serial controllers is saturated, but where at least one of the remaining controllers is completely unused, and thus has its full bandwidth lying dormant.

It is an object of the present invention to provide a computer which overcomes or at least alleviates these problems.

It is also an object of the present invention to provide a method of connecting devices to data bus controllers and to provide a method of allocating the bandwidth of a plurality of data bus controllers to a plurality of controller ports which achieves this result.

It is also an object of the present invention to provide apparatus for allocating the bandwidth of a plurality of data bus controllers to a plurality of controller ports which offers advantages over known apparatus.

SUMMARY OF THE INVENTION

According to a first aspect of the present invention, there is provided a computer having a plurality of data bus controllers, a plurality of grouped controller ports and a plurality of connection elements for connecting the controllers to the ports wherein each controller has a maximum available controller bandwidth; characterized in that the connection elements are arranged such that each controller is connected to ports from different groups such that data pathways between the controllers and the ports are not variable, and a maximum port group bandwidth available to each port group cannot be changed, irrespective of a bandwidth demand at said each port group.

Preferably, each controller is connected to at least two ports, the ports being in different groups.

The grouping of the ports may be spatial, in that the ports of a given group are located on a chassis of the computer closer to one another than they are to ports of a different group.

Two of the groups may be located, respectively, towards or at the front and rear of the chassis.

Preferably, the computer is provided with three controllers and six ports, a first group of three ports being connected to three controllers, a second group of two ports being connected to two controllers, the sixth port being connected to one controller.

Although it will be appreciated by those well-versed in the relevant art that the invention is applicable to a wide variety of systems which employ data bus connections, the invention is aimed in particular at computers having serial, and in particular USB, controllers.

By connecting the ports of a given group to more than one controller, the load exerted on that group is effectively shared between the plurality of associated controllers which, at one extreme, provides each port of the group with the full bandwidth of a controller.

As will be appreciated, his is in stark contrast to the current, standard configuration, where sequential connection of devices to grouped controller ports can easily clog the single controller to which the ports are connected.

According to a second aspect of the present invention, there is provided a method of connecting devices to data bus controllers via controller ports comprising use of a computer in accordance with the first aspect of the present invention.

According to a third aspect of the present invention, there is provided a method of connecting devices to data bus controllers via groups of controller ports, wherein each controller has a maximum available controller bandwidth, wherein connection elements are arranged between the controllers and ports in such a manner that each controller is connected to ports from different groups such that data pathways between the controllers and the ports are not variable, and a maximum port group bandwidth available to each port group cannot be changed, irrespective of a bandwidth demand at said each port group.

The invention, in its third aspect, may comprise the use of a computer in accordance with the first aspect of the present invention.

BRIEF DESCRIPTION OF THE DRAWINGS

The invention, in its various aspects, will now be described in greater detail, but strictly by way of example only, by reference to the accompanying drawings, of which

FIG. 3 is a schematic illustration of a dynamic—i.e. variable—configuration of the connection elements.

BEST MODE OF THE INVENTION

Figure 1:
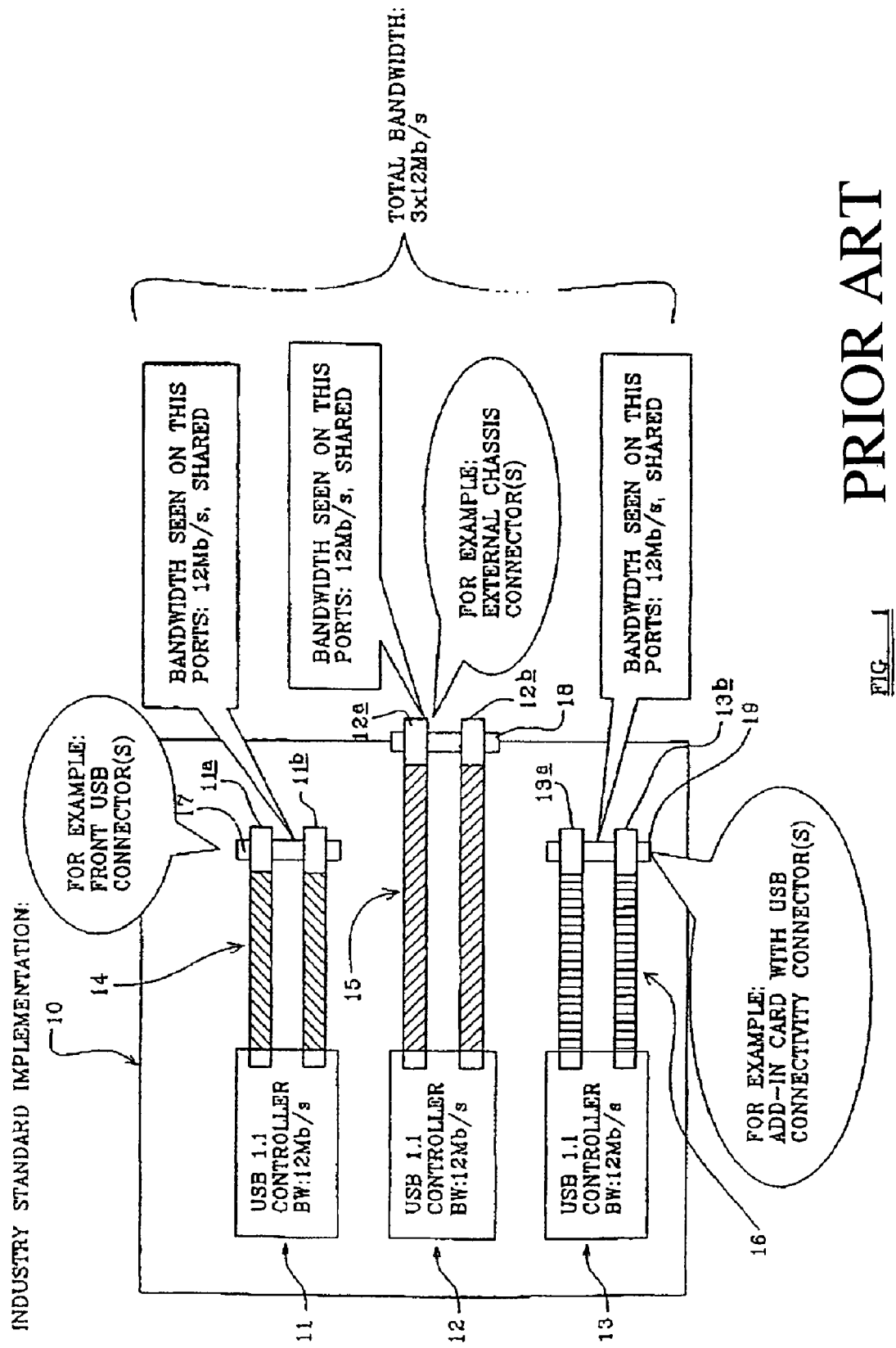
FIG. 1 is a schematic illustration of the current industry standard way of connecting serial data bus controllers to serial ports.

Referring first to FIG. 1, this shows, in schematic form, how USB controllers, their ports, and their intermediate connection elements are currently arranged, in accordance with Intel's industry standard.

As can be seen, a computer chassis 10 has attached thereto three USB 1.1 controllers 11, 12 and 13 to which are connected pairs of serial ports 11a/11 b, 12a/12b and 13a/13b. The pairs of ports are connected to the three controllers by parallel connecting elements shown generally at 14, 15 and 16 with the pairs of ports being physically "bundled" together by attachment plates or the like illustrated in schematic form at 17, 18 and 19. It will be appreciated, however, that the connection members 17, 18 and 19 do not effect any electrical—and hence data transfer—connection between the various ports—they simply maintain the port pairs in position.

In the example shown in FIG. 1, the ports 11a and 11b are disposed on the front side of the computer chassis 10, and thus may serve, for example, to connect serial devices such as web cams and USB speaker sets, which a user of the computer may wish to connect and disconnect on a fairly regular basis.

In contrast, the ports 12a and 12b are disposed on the rear wall of the chassis and are thus likely to be considerably less accessible by the user.

The ports 13a and 13b, however, are located within the computer chassis, and serve to allow connection of appropriately configured USB cards.

As will be appreciated, the total bandwidth which is available from each port is limited to the maximum bandwidth of the controller to which each pair is attached. Thus, in the case of a USB 1.1 controller, the maximum bandwidth available between each pair of ports is 12 Mbits per second. This, of course, is shared between each port of the respective pairs.

From this, it will be appreciated that the connection of two relatively high bandwidth devices to a given pair of ports is very likely to place an unacceptable bandwidth demand on the controller to which the pair is connected, leading to greatly reduced functionality of one or both of the devices, and consequently to user frustration and general dissatisfaction.

It will be appreciated that this problem is exacerbated by the positioning of the pairs of ports—a user, having connected a device, say, to port 11a, is highly unlikely to connect an additional device to any of the ports connected to controllers 12 or 13, and is almost certain, for reasons of convenience, to connect the next device to port 11b. This, as will be appreciated, can lead to saturation of the bandwidth available from controller 11, leaving the bandwidth available from controllers 12 and 13 entirely "untouched".

Figure 2:
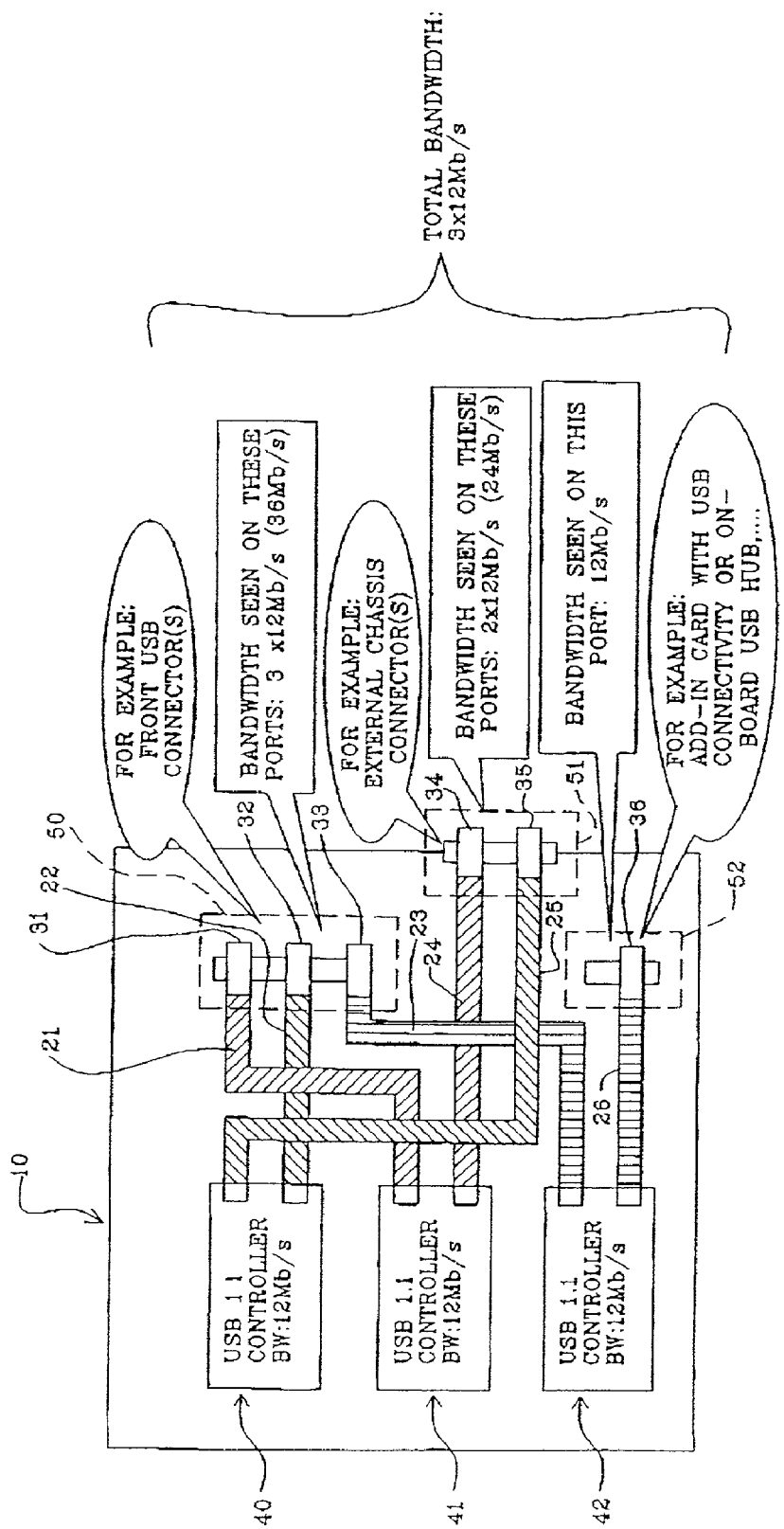
FIG. 2 is a schematic illustration of a static configuration of controllers, ports and connection elements in accordance with the invention.

FIG. 2, representative of the invention, illustrates in schematic form how these prior art problems can be greatly alleviated.

In contrast to the arrangement shown in FIG. 1, the connection elements shown in FIG. 2 (21, 22, 23, 24, 25 and 26) are routed from the ports 31, 32, 33, 34, 35 and 36 in a manner whereby each controller 40, 41 and 42 is connected to ports from different port groups 50, 51 and 52.

The effect of this specific routing configuration is that the maximum bandwidth available from the port group 50 is three times that which is available from a single controller—i.e. 36 Mbits per second where the controllers are USB 1.1 (12 Mbits per second) controllers.

Similarly, the maximum bandwidth available from port group 51 is 24 Mbits per second—i.e. twice that which is available from a single USB 1.1 controller.

Port 36 has just 12 Mbits per second available, although as this port is disposed internally of the chassis, it is less likely to be used than any of the preceding five.

The configuration shown in FIG. 2 enables the total available bandwidth to be used in a far more efficient manner than has hitherto been possible, as is illustrated by the following example. A user, wishing to connect a high bandwidth serial device to one of the three front USB ports 31, 32 or 33 has the freedom to select any one of the three available ports. On the assumption that no devices are connected to the rear external ports 34 or 35, or to the internal port 36, each of the front ports 31, 32 and 33 offer the full bandwidth available from the associated controllers 41, 40 and 42. Should the user then wish to connect an additional high bandwidth serial device, either of the remaining two ports In the group 50 may be used, as each of these will still offer a full bandwidth capability from the two "unused" controllers. As will be appreciated, the same applies where a third high bandwidth serial device is connected to the front group of ports 50.

Conversely, should the user wish to connect two high bandwidth serial devices to the rear port group 51, each of the ports 34 and 35 offer full bandwidth capability, on the assumption that the ports 31 and 32, respectively, are not already used for connection of other high bandwidth devices.

It will thus be appreciated that whilst the total bandwidth available from the three controllers 40, 41 and 42 is still 36 Mbits per second—as with the arrangement shown in FIG. 1—the available bandwidth can be distributed far more efficiently by routing the various connection elements in the manner shown.

FIG. 3 shows, again in schematic form, how the invention can be put into practice on a dynamic basis, by providing connection elements between the controllers and ports, whose arrangement can be modified in accordance with the bandwidth required by various devices and the bandwidth available from the controllers to which the ports may be connected.

To this end, the computer chassis 10, which in his example is provided with two USB 1.1 controllers 60 and 61, has attached thereto two groups of ports 71/72 and 73/74, the ports 71 and 72 being grouped together and provided towards the front of the computer chassis, the ports 73 and 74 also being grouped but provided on a rear part of the chassis.

In contrast to the arrangements shown in FIGS. 1 and 2, in which the connection elements are fixed in relation to the chassis, the connection elements shown in FIG. 3 are dynamic, in that the data pathways between the controllers 60 and 61 and the ports 71 to 74 are variable. Specifically, the connection elements in this example comprise "controller-side" connection element parts 81, 82, 83 and 84, and a number of "port-side" connection element parts 85, 86, 87a, 87b 87c, 88a and 88b.

Disposed between the controller-side and port-side connection element parts are a number of switch elements 90, 91 and 92 which comprise switch members 93, 94, 95 and 96 and contact members 97, 98, 99, 100, 101, 102, 103 and 104.

Switch members 93 and 94 are connected by a non-conductive (and hence non-data transferring) joining member 105, such that movement of the switch member 93 between the contacts 97 and 98 induces corresponding movement of the switch member 94 between the contacts 99 and 100, and vice versa.

With the connection element arrangement shown in FIG. 3 (i.e. with the switch members each in an "up" condition, in data transferring contact with, respectively, contacts 97, 99, 101 and 103), attachment of a serial device to port 71 will connect that device, via the port-side connection element part 85 and the controller-side connection element part 81, to the controller 60.

Should a further high bandwidth device then be attached to port 72, this would be connected, via port-side connection element parts 87a and 87b and via controller-side connection element part 84, to the controller 61, thus also providing the additional device with full bandwidth capability.

It will be appreciated by those skilled in the art that detection methods are already known whereby serial bus controllers such as USB controllers are able to determine, using electrical criteria or an adapted transaction(s) on the data bus, the bandwidth required by a given serial device, once that device has been connected to a serial port. Thus, in the example just described, if the further device attached to port 72 were in fact found by the USB controller 61 to be a low bandwidth device, the invention also provides for the generation, conveniently by the operating system, in communication with the USB controller, of a control signal which is operative to change the positions of the switch members 95 and 96, thus causing the further device—now attached to port 72—to be connected, via switch member 96 and contact member 104, to the first controller 60, as the controller 60 is likely to have sufficient bandwidth remaining to accommodate the demands of the device on port 72.

This, of course, leaves controller 61 with its full available bandwidth, so that connection of a high bandwidth device to either of ports 73 or 74 will result in that device being connected to the unburdened controller 61, via the switch member 94 and contact 99 (in the case of port 73) or via switch member 95 and contact 102 (in the case of port 74).

As mentioned above, it is envisaged that software control of the arrangement of the connection elements (i.e. the positioning of the switch members 93, 94, 95 and 96) is likely to be the most convenient manner in which to effect the dynamic routing modification which the invention provides for. To his end, appropriate software instructions 110 may be contained within the computer's operating system 111, such that upon receipt of appropriate control signals 60a or 61a from the controllers 60 and 61, the control software 110 is operative to generate and dispatch command signals 120 to the switch elements 90, 91 and 92, to change the positions of the switch members 93 to 96, in accordance with the bandwidth required by the connected devices, and the bandwidth available from the controllers 60 and 61.

Location of the control software within the operating system 111 is particularly advantageous, as the operating system is best able to identify available bandwidth, bandwidth required by devices and the location of connected devices.

However, to obtain a more reliable running environment, the control software could also (or in addition) be provided as part of the computer's main BIOS 112, as shown schematically in dotted outline, and at 110a. This would be advantageous as the BIOS is embedded in the Mother Board, and is not thus operating system dependant. The control software could alternatively be contained within the computer's shadow RAM (where provided), to which the BIOS information is copied during boot-up.

As further alternatives, the control software could conceivably be contained within the controllers 60 and 61, although this could result in reduced efficiency of the controllers as the controllers may not be able to obtain sufficient detailed information concerning the exact bandwidth required or requested by the various devices.

Lastly, it is also envisaged by the applicants that the control software 110/110a could be configured so as to operate during real-time running of the computer and the already connected devices. Thus, in the case of devices such as web cams and USB speakers, for example, whose bandwidth requirements vary in accordance with the tasks they perform (more complicated video sequences require more bandwidth, as do complex audio files) the control software may monitor the bandwidth requirement of these devices on an ongoing basis, dynamically allocating bandwidth from the controllers to the devices as and when their needs dictate. It will however be appreciated that additional control software may be required in order to compensate for the real-time switching of controllers which is likely to occur as a result of this dynamic monitoring, with this conveniently being provided in the operating system 111.

In summary, the invention, in its various aspects, allows for a great improvement to be obtained in the operating efficiency of a computer of the type having a plurality of connected devices, by allocating bandwidth to the devices in accordance with their demands In the case of the "static" embodiment, this is achieved, quite simply, by appropriate routing of the connection elements between the controllers and the associated ports in such a manner that sequential connection of devices to the ports of a given group does not result in overloading—and hence clogging—of a single controller.

In the case of the "dynamic" embodiment, bandwidth allocation is effected not only in accordance with the ports to which the devices are connected, but also in accordance with their required bandwidth, and the bandwidth which is available from the various data bus controllers provided in the computer.

Overall, use of the invention enables a far more efficient mode of operation to be obtained, leading, in turn, to less user dissatisfaction.

As a final point, it should be noted, for the avoidance of any doubt, that the applicants envisage that the invention, in its various aspects, could well be applied to a number of electronic devices where a data processing capability is required. Thus, the term "computer" as featured in this specification should be interpreted broadly, to encompass not only "computers" per se, but also a range of other electronic devices such as, for example, personal organisers, personal digital assistants (PDA's) and network devices such as hubs and switching units.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A computer having a plurality of data bus controllers, a plurality of grouped controller ports and a plurality of connection elements for connecting the controllers to the ports, wherein each controller has a maximum available controller bandwidth; characterized in that the connection elements are arranged such that each controller is connected to ports from different groups such that data pathways between the controllers and the ports are not variable, and a maximum port group bandwidth available to each port group cannot be changed, irrespective of a bandwidth demand at said each port group.

2. A computer according to claim 1 wherein each controller is connected to at least two ports, the ports being in different groups.

3. A computer according to claim 1 wherein the grouping of the ports is spatial, in that the ports of a given group are located on a chassis of the computer closer to one another than they are to ports of a different group.

4. A computer according to claim 1, wherein two of the groups are located, respectively, towards or at the front and rear of the chassis.

5. A computer according to claim 1 having three controllers and six ports, a first group of three ports being connected to three controllers, a second group of two ports being connected to two controllers, the sixth port being connected to one controller.

6. A computer according to claim 1 wherein the data bus controllers are USB controllers.

7. A method of connecting devices to data bus controllers via controller ports comprising use of a computer in accordance with claim 1.

8. A computer according to claim 1 wherein the connection elements are arranged so that no two ports connected to a same controller belong to a same group of ports.

9. A method of connecting devices to data bus controllers via groups of controller ports, wherein each controller has a maximum available controller bandwidth; wherein connection elements are arranged between the controllers and ports in such a manner that each controller is connected to ports from different groups such that data pathways between the controllers and the ports are not variable, and a maximum port group bandwidth available to each port group cannot be changed, irrespective of a bandwidth demand at said each port group.

10. A method according to claim 9, wherein the data bus controllers, the groups of controller ports, and the connection elements are comprised in a computer.

11. A method according to claim 9, further comprising arranging the connection elements so that no two ports connected to a same controller belong to a same group of ports.

* * * * *